US011878363B2

(12) United States Patent
Hatakeda et al.

(10) Patent No.: US 11,878,363 B2
(45) Date of Patent: Jan. 23, 2024

(54) ROLL-BONDED BODY AND METHOD FOR PRODUCING ROLL-BONDED BODY

(71) Applicant: TOYO KOHAN CO., LTD, Tokyo (JP)

(72) Inventors: Takafumi Hatakeda, Yamaguchi (JP); Yusuke Hashimoto, Yamaguchi (JP); Teppei Kurokawa, Yamaguchi (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 17/043,867

(22) PCT Filed: Apr. 1, 2019

(86) PCT No.: PCT/JP2019/014412
§ 371 (c)(1),
(2) Date: Sep. 30, 2020

(87) PCT Pub. No.: WO2019/198549
PCT Pub. Date: Oct. 17, 2019

(65) Prior Publication Data
US 2021/0023648 A1    Jan. 28, 2021

(30) Foreign Application Priority Data

Apr. 10, 2018 (JP) ................................ 2018-075678

(51) Int. Cl.
*B23K 20/00* (2006.01)
*B23K 20/04* (2006.01)
(Continued)

(52) U.S. Cl.
CPC ............... *B23K 20/04* (2013.01); *B21B 1/22* (2013.01); *B21B 2001/221* (2013.01); *B23K 2103/10* (2018.08); *B32B 15/015* (2013.01)

(58) Field of Classification Search
CPC ........................ B23K 20/04; B23K 2103/10; B23K 2103/12; B23K 1/00; B23K 1/008;
(Continued)

(56) References Cited

U.S. PATENT DOCUMENTS 3,834,202 A * 9/1974 Kawaguchi .............. B21D 1/05
                                                              72/163
3,882,648 A * 5/1975 Buchinski ................. B24B 1/00
                                                              451/59
(Continued)

FOREIGN PATENT DOCUMENTS

JP    62-003806 A    1/1987
JP    2000-312979 A   11/2000
(Continued)

OTHER PUBLICATIONS

JP2004306098A computer translation (Year: 2022).*
(Continued)

*Primary Examiner* — Erin B Saad
(74) *Attorney, Agent, or Firm* — Foley & Lardner LLP

(57) ABSTRACT

It is an object of the present invention to provide a roll-bonded laminate controlled in warping and a method for producing the same. The method produces the roll-bonded laminate having a two-layer structure of a first metal layer and a second metal layer, by roll-bonding a first metal plate and a second metal plate, wherein the surface hardness Hv of the first metal plate is lower than the surface hardness Hv of the second metal plate; and the method comprises roll-bonding so as to satisfy the following expression (1):

$$0 < (\Delta L_1/\Delta L_2)/T \leq 38 \quad (1)$$

wherein $\Delta L_1$ (mm) represents an elongation amount of the first metal layer with respect to the first metal plate; $\Delta L_2$ (mm) represents an elongation amount of the second metal
(Continued)

layer with respect to the second metal plate; and T (mm) represents the total thickness of the roll-bonded laminate.

8 Claims, 5 Drawing Sheets

(51) Int. Cl.
  *B21B 1/22* (2006.01)
  *B23K 103/10* (2006.01)
  *B32B 15/01* (2006.01)
(58) Field of Classification Search
  CPC ...... B23K 20/02; B23K 20/16; B23K 20/233; B23K 2103/05; B23K 2103/14; B23K 2103/166; B23K 2103/18; B23K 2103/26; B23K 26/0006; B23K 26/34; B23K 35/001; B23K 35/0238
  See application file for complete search history.

(56) References Cited

U.S. PATENT DOCUMENTS

| | | | |
|---|---|---|---|
| 6,475,675 B1* | 11/2002 | Pandey | B23K 35/001 429/233 |
| 8,420,225 B2* | 4/2013 | Haynes | G01K 5/66 428/617 |
| 10,259,082 B2* | 4/2019 | Ranganathan | B23K 20/16 |
| 2001/0016369 A1* | 8/2001 | Zandman | H01L 21/76898 257/E21.597 |
| 2001/0034126 A1* | 10/2001 | Ding | H01L 21/76834 257/E21.585 |
| 2002/0028576 A1* | 3/2002 | Hashim | H01L 23/5226 438/653 |
| 2015/0190985 A1 | 7/2015 | Oda et al. | |
| 2015/0354023 A1* | 12/2015 | Ranganathan | B32B 15/013 148/532 |
| 2018/0281103 A1* | 10/2018 | Nanbu | C21D 6/00 |
| 2019/0047254 A1 | 2/2019 | Yamamoto | |
| 2021/0023648 A1* | 1/2021 | Hatakeda | B21B 1/22 |

FOREIGN PATENT DOCUMENTS

| | | |
|---|---|---|
| JP | 2004-306098 A | 11/2004 |
| JP | 2005-194571 A | 7/2005 |
| JP | 2010-094685 A | 4/2010 |
| JP | 5410646 B1 | 2/2014 |
| JP | 6237950 B1 | 11/2017 |

OTHER PUBLICATIONS

International Search Report dated Jun. 18, 2019, in PCT/JP2019/014412.
Office Action dated Feb. 8, 2022 in JP 2018-075678.
Office Action dated May 30, 2023 in JP 2022-125994.

* cited by examiner

ROLL-BONDED BODY AND METHOD FOR PRODUCING ROLL-BONDED BODY

CROSS-REFERENCE TO RELATED APPLICATIONS

This application is the U.S. National Stage of PCT/JP2019/014412, filed Apr. 1, 2019, which claims priority to JP 2018-075678, filed Apr. 10, 2018.

TECHNICAL FIELD

The present invention relates to a roll-bonded laminate and a method for producing the same.

BACKGROUND ART

Roll-bonded laminates (metal laminated materials, clad materials) made by roll-bonding two or more kinds of metal plates, since having composite characteristics which cannot be attained by a single material, are utilized in various fields. As such roll-bonded laminates, there are known, for example, roll-bonded laminates composed of a soft layer of copper (Cu), aluminum (Al) or the like and a hard layer of stainless steel (SUS), titanium (Ti) or the like.

Clad materials of SUS and Cu are preferable in the point of having characteristics of both of the mechanical strength and moldability of SUS and the heat dissipation and electric conductivity of Cu, and are used, for example, as heat-dissipating members inside electronic devices such as mobile electronic devices. As clad materials of SUS and Cu, for example, those of Patent Literatures 1 and 2 are known.

Patent Literature 1 discloses a chassis composed of a clad material made by roll-bonding a first layer formed of an austenitic stainless steel, a second layer formed of Cu or a Cu alloy and laminated on the first layer, and a third layer formed of an austenitic stainless steel and laminated on the opposite side to the first layer of the second layer, wherein the thickness of the second layer is equal to or more than 15% of that of the clad material.

Patent Literature 2 discloses a clad material having a first layer constituted of a stainless steel, and a second layer constituted of Cu or a Cu alloy and roll-bonded to the first layer, wherein the crystal grain size of the second layer, as measured by a comparison method of JIS H0501, is 0.150 mm or less, and discloses, in Examples, a SUS/Cu/SUS clad material.

However, while the three-layer materials, for example, SUS/Cu/SUS described in Examples of Patent Literatures 1 and 2, hardly cause warping in roll-bonded laminates after being bonded, two-layer materials composed of a hard layer and a soft layer, like SUS/Cu, are liable to cause large warping. When roll-bonded laminates after being bonded cause large warping, even if a shape correction is thereafter made, the warping remains. Therefore, putting two-layer materials on practical use is difficult. The reason why three-layer materials hardly cause warping is that the three-layer materials have a structure in which the front and the back are symmetrical, and the elongation amounts of the front and the back in rolling are not different.

CITATION LIST

Patent Literature

Patent Literature 1: Japanese Patent No. 5410646
Patent Literature 2: Japanese Patent No. 6237950

SUMMARY OF INVENTION

Technical Problem

As described above, a roll-bonded laminate having a two-layer structure composed of two kinds of metal layers different in hardness, like a soft layer and a hard layer, poses such a problem that warping of the roll-bonded laminate after being bonded is liable to be caused. Then, when roll-bonded laminates after being bonded cause large warping, even if a shape correction is thereafter made, the warping remains; so, particularly when the roll-bonded laminates are used in applications requiring flatness, it is not preferable. However, in roll-bonded laminates having a two-layer structure composed of two kinds of metal layers different in hardness, warping is difficult to control, and specific solutions thereto have been demanded. Then, it is an object of the present invention to provide a roll-bonded laminate controlled in warping and a method for producing the same.

Solution to Problem

As a result of exhaustive studies to solve the above problem, the present inventors have found that in roll-bonding, warping can be controlled by controlling the ratio of the elongation amount of each metal layer in a specific range, and this finding has led to the completion of the present invention. That is, the gist of the present invention is as follows.

(1) A method for producing a roll-bonded laminate having a two-layer structure of a first metal layer and a second metal layer, by roll-bonding a first metal plate and a second metal plate,
wherein a surface hardness Hv of the first metal plate is lower than a surface hardness Hv of the second metal plate; and
the method comprises roll-bonding so as to satisfy the following expression (1):

$$0 < (\Delta L_1 / \Delta L_2)/T \leq 38 \quad (1)$$

wherein $\Delta L_1$ (mm) represents an elongation amount of the first metal layer with respect to the first metal plate; $\Delta L_2$ (mm) represents an elongation amount of the second metal layer with respect to the second metal plate; and T (mm) represents the total thickness of the roll-bonded laminate.

(2) The method for producing a roll-bonded laminate according to the above (1), wherein the total thickness of the roll-bonded laminate is 0.1 mm to 0.5 mm.

(3) The method for producing a roll-bonded laminate according to the above (1) or (2), wherein the first metal layer comprises copper, aluminum or an alloy thereof; and the second metal layer comprises a stainless steel, titanium, a titanium alloy or a nickel alloy.

(4) The method for producing a roll-bonded laminate according to any of the above (1) to (3), wherein the first metal layer comprises copper; and the second metal layer comprises a stainless steel.

(5) The method for producing a roll-bonded laminate according to any of the above (1) to (4), wherein a difference in hardness between the surface hardness Hv of the second metal plate and the surface hardness Hv of the first metal plate is 35 to 305.

(6) A roll-bonded laminate having a two-layer structure of a first metal layer and a second metal layer, wherein a surface hardness Hv of the first metal layer is lower than a surface hardness Hv of the second metal layer; and a warping radius as measured by the following warping test is 43.8 mm or more:

the warping test: a sample cut out from the roll-bonded laminate is placed on a horizontal plane so that the first metal layer is positioned on the upper side; a height of a point of the sample whose height from the horizontal plane is maximum is taken as a warping amount; and from the warping amount and a length of the sample corresponding to a length of a circular arc, a warping radius r corresponding to a radius of the circular arc is determined.

The present description includes the disclosed content of Japanese Patent Application No. 2018-075678, based on which priority of the present application is claimed.

Advantageous Effects of Invention

According to the present invention, there can be provided a roll-bonded laminate controlled in warping and a method for producing the same.

DESCRIPTION OF EMBODIMENTS

Figure 1:
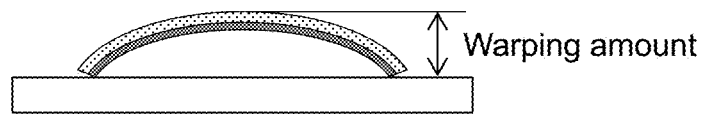
FIG. 1 is a schematic side view of a warping test.

Hereinafter, the present invention will be described in detail.

The present invention relates to a method for producing a roll-bonded laminate having a two-layer structure of a first metal layer and a second metal layer, by roll-bonding a first metal plate and a second metal plate.

The roll-bonded laminate consists of two layers of the first metal layer and the second metal layer. The surface hardness Hv of the first metal layer is lower than the surface hardness Hv of the second metal layer.

The first metal layer of the roll-bonded laminate is a soft layer and the surface hardness Hv thereof is lower than the surface hardness Hv of the second metal layer. A first metallic material to be used for the first metal layer is not especially limited, and examples thereof include copper (Cu), aluminum (Al), magnesium (Mg) and alloys thereof, but copper, aluminum and alloys thereof, which exhibit a high heat dissipation are preferable.

When using copper or aluminum as the first metallic material, from the viewpoint of raising the heat dissipation, a high-purity pure copper or pure aluminum is preferable. Specifically, the purity of copper or aluminum is preferably 99.0% by mass or higher, and more preferably 99.5% by mass or higher. As the pure copper, for example, oxygen free copper standardized in JIS H3510 (C1011) and JIS H3100 (C1020) and tough pitch copper standardized in JIS H3100 (C1100) prescribed in JIS can be used. The total content of metal elements added other than copper in the pure copper is preferably 0.5% by mass or lower, more preferably 0.3% by mass or lower, and especially preferably 0.15% by mass or lower. As the pure aluminum, for example, pure aluminum in 1000 series prescribed in JIS can be used. The total content of metal elements added other than aluminum in the pure aluminum is preferably 0.5% by mass or lower, more preferably 0.3% by mass or lower, and especially preferably 0.15% by mass or lower.

As the copper alloy, for example, copper alloys containing at least one metal element selected from Sn, Mn, Cr, Zn, Zr, Ni, Si, Mg and Ag, added as metal elements other than copper, in a total content of the metal elements added of higher than 1% by mass can be used.

As the aluminum alloy, aluminum alloys containing at least one metal element selected from Mg, Mn, Si and Cu, added as metal elements other than aluminum, in a total content of the metal elements added of higher than 1% by mass can be used. As the aluminum alloy, for example, Al alloys prescribed in JIS, Al—Cu alloys (2000 series), Al—Mn alloys (3000 series), Al—Si alloys (4000 series), Al—Mg alloys (5000 series), Al—Mg—Si alloys (6000 series) and Al—Zn—Mg alloys (7000 series) can be used.

The second metal layer of the roll-bonded laminate is a hard layer, and the surface hardness Hv thereof is higher than that of the first metal layer. A second metallic material to be used for the second metal layer is not especially limited, and for example, from the viewpoint of the thickness reduction and the strength enhancement, stainless steels (SUS), titanium (Ti) (pure titanium) or titanium alloys, nickel alloys and the like are preferable. Further in view of the heat dissipation, copper alloys and the like may be used; and from the viewpoint of the weight reduction, aluminum alloys, magnesium alloys and the like may be used.

As the stainless steel, SUS304, SUS201, SUS316, SUS316L, SUS430 and the like can be used. As the stainless steel, according to a desired surface hardness Hv, BA-finished materials, ½H materials, ¾H materials and the like can be used, though not limited thereto.

When using titanium as the second metallic material, from the viewpoint of controlling the warping in the roll-bonded laminate, a high-purity pure titanium, which can be made large in the elongation amount in bonding and low in the elongation ratio of the first metallic material to the second metallic material is preferable. Specifically, the purity of titanium is preferably 99.0% by mass or higher, and more preferably 99.5% by mass or higher. As the pure titanium, a pure titanium, in which the total content of metal elements added other than titanium is 1% by mass or lower, is preferable. The total content of the metal elements added other than titanium in the pure titanium is preferably 0.5% by mass or lower, more preferably 0.3% by mass or lower, and especially preferably 0.15% by mass or lower. As the pure titanium, for example, a pure titanium of class 1 to 4 prescribed in JIS H4600 can be used.

As the titanium alloy, titanium alloys containing at least one metal element selected from V, Cr, Sn, Al, Mo, Zr and Pd, added as metal elements other than titanium, in a total content of the metal elements added of higher than 1% by mass can be used. As the titanium alloy, for example, α-type, β-type, α+β-type or other ones can be used; and in view of the strength, β-type and α+β-type ones are preferable, and in view of the workability, α-type and α+β-type ones are preferable.

As the nickel alloy, nickel alloys containing at least one metal element selected from V, Cr, Si, Al, Ti, Mo, Mn, Zn, Sn, Cu, Co and Fe, added as metal elements other than nickel, in a total content of the metal elements added of higher than 1% by mass can be used. As the nickel alloy, for example, Hastelloy and the like can be used.

As the copper alloy, for example, copper alloys containing at least one metal element selected from Sn, Mn, Cr, Zn, Zr, Ni, Si, Mg and Ag, added as metal elements other than copper, in a total content of the metal elements added of higher than 1% by mass can be used.

As the aluminum alloy, aluminum alloys containing at least one metal element selected from Mg, Mn, Si and Cu, added as metal elements other than aluminum, in a total content of the metal elements added of higher than 1% by mass can be added. As the aluminum alloy, for example, Al alloys prescribed in JIS, Al—Cu alloys (2000 series), Al—Mn alloys (3000 series), Al—Si alloys (4000 series), Al—Mg alloys (5000 series), Al—Mg—Si alloys (6000 series) and Al—Zn—Mg alloys (7000 series) can be used.

As combinations of the first metal layer and the second metal layer of the roll-bonded laminate, a combination of the first metal layer composed of copper, aluminum or an alloy thereof and the second metal layer composed of a stainless steel, titanium, a titanium alloy or a nickel alloy (Cu/SUS, Cu/Ti, Cu/Ni, Al/SUS, Al/Ti, Al/Ni) is preferable; and a combination of the first metal layer composed of copper and the second metal layer composed of a stainless steel is more preferable.

The method for producing the roll-bonded laminate according to the present invention comprises providing a first metal plate and a second metal plate and roll-bonding these to thereby produce the roll-bonded laminate having a two-layer structure of a first metal layer and a second metal layer.

The first metal plate (original plate) to be used in the method for producing the roll-bonded laminate according to the present invention is a plate material of the above first metallic material for the first metal layer of the roll-bonded laminate.

The thickness of the first metal plate is not especially limited, and is usually 0.01 mm to 0.8 mm; and the lower limit is preferably 0.025 mm or more, more preferably 0.05 mm or more, and in particular, as a heat-dissipating member, preferably 0.075 mm or more. The upper limit is more preferably 0.5 mm or less, still more preferably 0.45 mm or less, and especially preferably 0.4 mm or less. The thickness of the first metal plate can be measured with a micrometer or the like, and refers to an average value of thicknesses measured at 10 points randomly selected from on the surface of the first metal plate.

The surface hardness Hv of the first metal plate is not especially limited as long as it is lower than the surface hardness Hv of the second metal plate, and for example, the lower limit is 19 or higher, and from the viewpoint of suppression of warping, preferably 30 or higher. In view of the moldability and the bonding strength, the upper limit is 200 or lower, and preferably 170 or lower. The surface hardness Hv can be measured, for example, by using a micro-Vickers hardness tester according to JIS Z2244 (Vickers hardness test—Test method).

The second metal plate (original plate) to be used in the method for producing the roll-bonded laminate according to the present invention is a plate material of the above second metallic material for the second metal layer of the roll-bonded laminate.

The thickness of the second metal plate is not especially limited, and is usually 0.01 mm to 0.5 mm; and the lower limit is preferably 0.025 mm or more, and more preferably 0.05 mm or more; and the upper limit is preferably 0.45 mm or less, and more preferably 0.4 mm or less. The thickness of the second metal plate can be measured as in the first metal plate above.

The surface hardness Hv of the second metal plate is not especially limited as long as it is higher than the surface hardness of the first metal plate, and for example, in view of the mechanical strength, the lower limit is 50 or higher, and preferably 60 or higher. In view of the moldability and the bonding strength, the upper limit is 400 or lower, and preferably 370 or lower. For example, for a stainless steel, the surface hardness Hv is preferably 180 to 400; and for titanium or a titanium alloy, the surface hardness Hv is preferably 110 to 380. The surface hardness Hv of the second metal plate can be measured as in the first metal plate above.

The difference in hardness between the surface hardness Hv of the second metal plate and the surface hardness Hv of the first metal plate is preferably 35 to 305, and more preferably 35 to 260. From the viewpoint of controlling warping in the roll-bonded laminate, a smaller difference in hardness is better. When the difference in hardness is in this range, warping in the roll-bonded laminate can sufficiently be controlled and a good flatness can be secured. Here, the respective surface hardnesses Hv of the first metal layer and the second metal layer of the roll-bonded laminate after being bonded are, when the conditioning of the first metal plate and the second metal plate of the original plates is for a hard type (for example, H materials), likely to become nearly equal to those of the respective original plates and, when the conditioning is for a soft type (for example, O materials and annealed materials), likely to become higher than those of the respective original plates.

In the method according to the present invention, the roll-bonded laminate can be produced by mutually bonding the first metal plate and the second metal plate by various types of methods such as cold rolling bonding, hot rolling bonding and surface-activating bonding.

The method according to the present invention comprises roll-bonding the first metal plate and the second metal plate so as to satisfy the following expression (1):

$$0<(\Delta L_1/\Delta L_2)/T \leq 38 \tag{1}$$

wherein $\Delta L_1$ (mm) represents an elongation amount of the first metal layer of the roll-bonded laminate with respect to the first metal plate; $\Delta L_2$ (mm) represents an elongation amount of the second metal layer of the roll-bonded laminate with respect to the second metal plate; and T (mm) represents the total thickness of the roll-bonded laminate. Here, in the above expression (1), the lower limit of $(\Delta L_1/\Delta L_2)/T$ is not especially limited, but is higher than 0. $(\Delta L_1/\Delta L_2)/T$ is preferably 35 or lower, more preferably 33 or lower, and still more preferably 28 or lower.

The elongation ratio $(\Delta L_1/\Delta L_2)$ of the elongation amount $\Delta L_1$ (mm) of the first metal layer of the roll-bonded laminate to the elongation amount $\Delta L_2$ (mm) of the second metal layer thereof is preferably 1.1 to 38, more preferably 1.1 to 19, and especially preferably 1.1 to 13.

In the method according to the present invention, warping in an obtained roll-bonded laminate can be controlled by roll-bonding the first metal plate and the second metal plate so as to satisfy the expression (1).

The elongation amount $\Delta L_1$ (mm) of the first metal layer of the roll-bonded laminate refers to an elongation amount from the first metal plate as an original plate due to roll-bonding. The elongation amount $\Delta L_1$ (mm) is 0.11 mm to 25.0 mm, and preferably 0.11 mm to 15.0 mm when a gauge length is 150 mm for example. The elongation amount $\Delta L_1$ can be determined, for example, by scribing marks on a predetermined gauge length (for example, 150 mm) and at predetermined intervals (for example, 10 mm intervals) on the first metal plate, and measuring the elongation amount (mm) of the first metal layer after being roll-bonded from the first metal plate. In the gauge length of 100 to 250 mm, the elongation amount is nearly proportional to the gauge length.

The elongation amount $\Delta L_2$ (mm) of the second metal layer of the roll-bonded laminate refers to an elongation amount from the second metal plate as an original plate due to roll-bonding. The elongation amount $\Delta L_2$ (mm) is 0.1 mm to 20.0 mm, and preferably 0.1 mm to 10.0 mm when a gauge length is 150 mm for example. The elongation amount $\Delta L_2$ can be measured as in the elongation amount $\Delta L_1$ above. The elongation amount $\Delta L_2$ is usually less than the elongation amount $\Delta L_1$.

The total thickness T (mm) of the roll-bonded laminate is not especially limited, and is usually 0.05 mm to 1.0 mm, and preferably 0.1 mm to 0.5 mm. The lower limit of the total thickness T is preferably 0.1 mm or more, and more preferably 0.15 mm or more; and the upper limit is preferably 0.5 mm or less, and more preferably 0.45 mm or less. The total thickness T of the roll-bonded laminate refers to an average value of measurement values obtained by measuring the thicknesses of any 30 points on the roll-bonded laminate with a micrometer or the like. In particular, as applications to heat-dissipating members, from the viewpoint of the strength enhancement, the weight reduction and the thickness reduction, the above range is preferable.

As described above, as a bonding method, cold rolling bonding, hot rolling bonding, surface-activating bonding, and the like can be used.

In the cold rolling bonding method, the first metal plate and the second metal plate are subjected to brush grinding on the bonding surfaces thereof, and thereafter superposed and bonded under cold rolling, whereby the roll-bonded laminate can be produced. The cold rolling process may be carried out in multiple steps. In this method, the both are roll-bonded to a final reduction ratio (which is calculated from the thicknesses of the original plates before being bonded and the roll-bonded laminate) in the range of 20% to 90%. In the cold rolling bonding, it is preferable that a stabilizing heat treatment is carried out after being bonded.

In the hot rolling bonding method, as in the cold rolling bonding method, the bonding surfaces are subjected to blush grinding or the like; thereafter, both of the first metal plate and the second metal plate or one thereof is heated at 200° C. to 500° C.; and the both are superposed and hot rolled to be bonded, whereby the roll-bonded laminate can be produced. In this method, the final reduction ratio becomes about 15% to 40%.

In the surface-activating bonding method (including a vacuum surface-activating bonding method), the bonding surfaces are sputter etched and the sputter-etched surfaces are roll-bonded, whereby the roll-bonded laminate can be produced.

As described above, the bonding method for obtaining the roll-bonded laminate is not limited, but since the surface-activating bonding, whose rolling load is relatively low, can produce the roll-bonded laminate causing no warping or small warping, as the bonding method, the surface-activating bonding is preferable. Therefore, the method for producing the roll-bonded laminate according to the present invention preferably comprises a step of sputter etching the bonding surfaces of the first metal plate and the second metal plate, and a step of roll-bonding the sputter-etched surfaces so as to satisfy the expression (1). Hereinafter, the surface-activating bonding method will be described.

In the sputter etching treatment, each of the bonding surfaces of the first metal plate and the second metal plate is sputter etched.

The sputter etching treatment is carried out, specifically, by providing the first metal plate and the second metal plate as long coils of 100 mm to 600 mm in width, and using, as one ground-connected electrode, each of the first metal plate and the second metal plate, which each have the bonding surface, and applying an alternating current of 1 MHz to 50 MHz between the electrode and the other insulated electrode to generate a glow discharge with the area of the electrode exposed to the plasma generated by the glow discharge being made to be ⅓ or smaller of the area of the other electrode. During the sputter etching treatment, the ground-connected electrode is in the form of a cooling roll, which prevents the transfer materials from temperature increase.

In the sputter etching treatment, by sputtering the surfaces, to be bonded with each other, of the first metal plate and the second metal plate with an inert gas in vacuum, adsorbates on the surfaces are completely removed and a part of or the whole of oxide film on the surfaces is removed. The oxide film does not necessarily need to be completely removed and even in a state of a part thereof remaining, a sufficient bonding force is provided. By making the oxide film partially remain, the sputter etching treatment time can be reduced greatly as compared with the complete removal, and the productivity of the roll-bonded laminate can be improved. As the inert gas, argon, neon, xenon, krypton or the like, or a mixed gas containing at least one thereof can be applied. For either of the first metal plate and the second metal plate, the surface adsorbates can be removed completely in an etching amount of about 1 nm (in terms of $SiO_2$).

The sputter etching treatment for the first metal plate can be carried out, for example, for a single plate, in vacuum, for example, at a plasma output of 100 W to 1 kW for 1 to 50 min, and for example, for a long material such as a line material, in vacuum, for example, at a plasma output of 100 W to 10 kW at a line velocity of 1 m/min to 30 m/min. A higher degree of vacuum at this time is better for preventing re-adsorption of the adsorbates to the surface, but the degree of vacuum may be, for example, $1\times10^{-5}$ Pa to 10 Pa. In the sputter etching treatment, the temperature of the first metal plate is held preferably at normal temperature to 150° C.

The first metal plate on whose surface the oxide film partially remains is obtained by making the etching amount of the first metal plate, for example, 1 nm to 10 nm. As required, the etching amount is allowed to be made more than 10 nm. Here, when the first metal plate is Cu; too much oxide film remained poses such a risk that the bonding force becomes insufficient, and in applications requiring some strength, when a later diffusion annealing step is not carried out to prevent softening of copper, the bonding force is allowed to be raised by making the state of no oxide film. So, etching in about 2 to 30 nm is preferable.

The sputter etching treatment for the second metal plate can be carried out, for example, for a single plate, in vacuum, for example, at a plasma output of 100 W to 1 kW for 1 to 50 min, and for example, for a long material such as a line material, for example, at a plasma output of 100 W to 10 kW at a line velocity of 1 m/min to 30 m/min. A higher degree of vacuum at this time is better for preventing re-adsorption of the adsorbates to the surface, but the degree of vacuum may be $1\times10^{-5}$ Pa to 10 Pa. In the sputter etching treatment, the temperature of the second metal plate is held preferably at normal temperature to 150° C.

The second metal plate on whose surface the oxide film partially remains is obtained by making the etching amount of the second metal plate, for example, 1 nm to 10 nm. As required, the etching amount is allowed to be made more than 10 nm.

The bonding surfaces sputter etched as described above of the first metal plate and the second metal plate are roll-bonded, for example, by roll pressure bonding so as to satisfy the expression (1) to bond the first metal plate and the second metal plate to thereby obtain the roll-bonded laminate having the two-layer structure of the first metal layer and the second metal layer.

In the roll-bonding, the reduction ratio of the roll-bonded laminate is preferably 15% or lower, more preferably 10% or lower, and still more preferably lower than 5%. The reduction ratio of the first metal layer is preferably 20% or lower, more preferably 15% or lower, and still more preferably 10% or lower. The reduction ratio of the second metal layer is preferably 14% or lower, more preferably 9% or lower, and still more preferably lower than 5%. Here, the lower limit is not especially limited, and is, since with a lower reduction ratio, the warping is more easily suppressed, preferably 0% or higher. For Cu/SUS, it is preferable that the reduction ratio of the first metal layer (Cu) is 10% or lower; that of the second metal layer (SUS) is 5% or lower; that of the whole is 10% or lower. The reduction ratio of the roll-bonded laminate is determined from the total thickness of the first metal plate and the second metal plate as the materials before being bonded, and the final thickness of the roll-bonded laminate.

In the roll-bonding by roll pressure bonding, the rolling line load of the roll pressure bonding is not especially limited, and is set so as to satisfy the expression (1). By regulating the rolling line load of the roll pressure bonding, the ratio ($\Delta L_1/\Delta L_2$) (in the present description, referred to also as elongation ratio) in the elongation amount of the first metal layer to the second metal layer can be regulated. The rolling line load of the roll pressure bonding can be set, for example, in the range of 0.2 tf/cm to 10.0 tf/cm. For example, when the roll diameter of a pressure roll is 100 mm to 250 mm, the rolling line load of the roll pressure bonding is preferably 0.5 tf/cm to 5.0 tf/cm, and more preferably 0.8 tf/cm to 4.0 tf/cm. When the roll diameter is large or when the thickness of the first metal plate and the second metal plate before being bonded is large, however, there sometimes arises such that the rolling line load needs to be made high in order to secure some pressure to attain a predetermined reduction ratio, so the rolling line load is not limited in this numerical range.

The temperature in bonding is not especially limited, and is normal temperature to 150° C.

It is preferable that the bonding is carried out in a non-oxidizing atmosphere, for example, in an inert gas atmosphere such as Ar, in order to prevent the decrease in the bonding strength between the first metal plate and the second metal plate due to re-adsorption of oxygen to surfaces of both the plates.

The roll-bonded laminate obtained by bonding the first metal plate and the second metal plate as described above, as required, can be subjected to a heat treatment. The heat treatment raises the adhesiveness between each layer and can make a sufficient bonding force. Since the heat treatment, when being carried out at a high temperature for a long time, is likely to form an intermetallic compound at the interface and reduce the adhesiveness (peel strength), the heat treatment needs to be carried out under a suitable condition. It is preferable that the heat treatment is carried out, for example, at 500° C. to 1,000° C. for 5 min to 10 hours on a roll-bonded laminate of a copper layer and a stainless steel layer; at 200° C. to 600° C. for 5 min to 10 hours on a roll-bonded laminate of an aluminum layer and a stainless steel layer; at 500° C. to 1,000° C. for 5 min to 10 hours on a roll-bonded laminate of a copper layer and a titanium layer; and at 200° C. to 600° C. for 5 min to 10 hours on a roll-bonded laminate of an aluminum layer and a titanium layer.

The roll-bonded laminate after being bonded or optionally being heat-treated may be subjected to a shape correction using a tension leveler so as to make an elongation ratio of about 1 to 2%. By the shape correction, the warping of the roll-bonded laminate can be reformed. Since the roll-bonded laminate produced by the method according to the present invention has no warping or a sufficiently small warping, by carrying out the shape correction using a tension leveler, a sufficient flatness can be secured.

The present invention relates also to the roll-bonded laminate produced as described above.

Specifically, the roll-bonded laminate according to the present invention has a two-layer structure of a first metal layer and a second metal layer, and the surface hardness Hv of the first metal layer is lower than that of the second metal layer.

The total thickness of the roll-bonded laminate, the kind and the surface hardness of the first metal layer, and the kind and the surface hardness of the second metal layer are described in the above-mentioned method for producing a roll-bonded laminate.

The thickness of the first metal layer of the roll-bonded laminate is not especially limited, and is usually 0.01 mm to 0.5 mm; the lower limit is preferably 0.025 mm or more, and more preferably 0.05 mm or more; and the upper limit is preferably 0.45 mm or less, and more preferably 0.4 mm or less. The thickness of the first metal layer of the roll-bonded laminate refers to an average value of values obtained by taking an optical microscopic photograph of a cross section of the roll-bonded laminate, and measuring thicknesses of the first metal layer at any 10 points in the optical microscopic photograph.

The thickness of the second metal layer of the roll-bonded laminate is not especially limited, and is usually 0.01 mm to 0.5 mm; the lower limit is preferably 0.025 mm or more, and more preferably 0.05 mm or more; and the upper limit is preferably 0.45 mm or less, and more preferably 0.4 mm or less. The thickness of the second metal layer of the roll-bonded laminate can be measured as in the first metal layer.

The upper limit of the ratio of the thickness of the second metal layer to the total thickness of the roll-bonded laminate is preferably 74% or lower, more preferably 65% or lower, and still more preferably 50%; and the lower limit is preferably 15% or higher. The ratio of the thickness of the second metal layer is preferably 15% to 74%, more preferably 30% to 70%, still more preferably 35% to 65%, and especially preferably 35% to 50%.

The surface hardness Hv of the first metal layer is lower than that of the second metal layer. The surface hardness Hv of the first metal layer is not especially limited, and the lower limit is, for example, 19 or higher, and from the viewpoint of suppression of warping, is preferably 30 or higher. In view of the moldability and the bonding strength, the upper limit is 200 or lower, and preferably 170 or lower. The surface hardness Hv can be measured as in the original plate.

The surface hardness Hv of the second metal layer is not especially limited as long as it is higher than the surface hardness Hv of the first metal layer; for example, in view of the mechanical strength, the lower limit is 50 or higher, and preferably 60 or higher. In view of the moldability and the bonding strength, the upper limit is 400 or lower, and preferably 375 or lower. For example, when the second metal layer is a stainless steel, the surface hardness Hv is preferably 180 to 400; and when it is titanium or a titanium alloy, the surface hardness Hv is preferably 110 to 380. The surface hardness Hv of the second metal layer can be measured as in the original plate.

The difference in hardness between the surface hardness Hv of the second metal layer and the surface hardness Hv of the first metal layer is preferably 35 to 305, and more preferably 35 to 260. From the viewpoint of controlling the warping in the roll-bonded laminate, a smaller difference in hardness is better. When the difference in hardness is in this range, in the roll-bonded laminate, the warping can be controlled sufficiently, and a good flatness can be secured.

The roll-bonded laminate according to the present invention is controlled in warping, and has no warping, or even if it has some warping, a very small warping. Specifically, in the roll-bonded laminate according to the present invention, the warping radius measured by a warping test is 43.8 mm or more.

Figure 2:
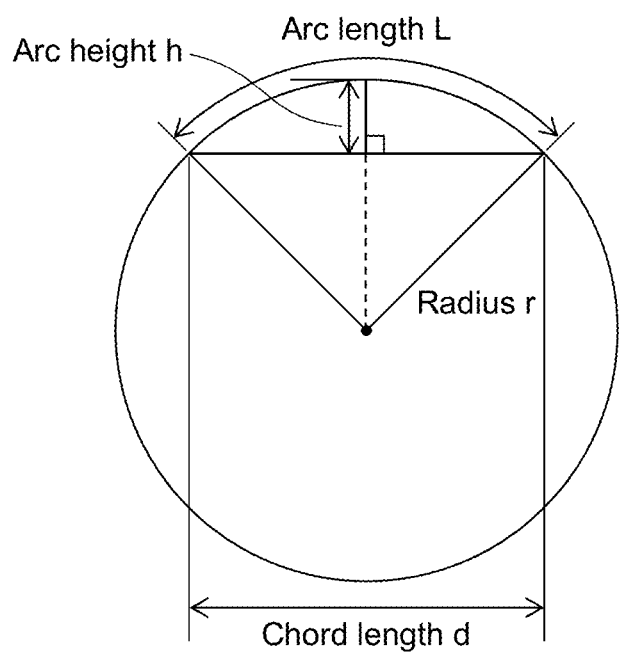
FIG. 2 is a reference diagram of a method of calculating a warping radius.

A process of determining the warping radius of a roll-bonded laminate will be described by reference to FIGS. 1 and 2. The warping radius of the roll-bonded laminate is determined by the following warping test: that is, as shown in FIG. 1, a sample in a specific size (for example, 100 mm in width×100 mm in length) cut out from the roll-bonded laminate is placed on a horizontal plane of a platen so that the first metal layer is positioned on the upper side; the height of a point of the sample whose height from the horizontal plane of the platen is maximum is taken as a warping amount; and from the warping amount (in FIG. 2, corresponding to an arc height h) and a length (in FIG. 2, corresponding to a circular arc length L) of the sample, the warping radius r corresponding to a radius of the circular arc is determined. The warping radius r can be calculated by the Newton-Raphson method using expressions: $L=r\theta$, $d=2r\sin(\theta/2)$ and $h=r(1-\cos(\theta/2))$. When the central angle of the circular arc exceeds 180°, the sample length is made short and then the measurement is carried out. Here, the shorter the warping radius, the larger the warping. The warping radius of 43.8 mm is the minimum value which brings about an actual result of warp reformation in a shape correction process after a rolling process. That is, the production experience has an actual result in which a roll-bonded laminate having a warping radius of 43.8 mm or more is given a sufficient flatness by the warp reformation process, and has a result in which a roll-bonded laminate having a warping radius of 43.8 mm or less, even if it is subjected to the warp reformation process, cannot be given a sufficient flatness.

Therefore, the roll-bonded laminate having a warping radius of 43.8 mm or more according to the present invention can be used with no shape correction, or can be reformed by a shape correction, whereby a roll-bonded laminate having a high flatness can be provided.

Since the roll-bonded laminate according to the present invention is controlled in warping, and has no warping, or even if it has some warping, a very small warping, and the warping can be reformed by a shape correction, the roll-bonded laminate is especially suitable for applications requiring the flatness. Such applications include utilization thereof, for example, as internal members for electronic devices (for example, internal reinforcing members), particularly as internal members for mobile electronic devices (mobile terminals).

Further the roll-bonded laminate having a two-layer structure according to the present invention, since it is excellent in the heat dissipation, for example, as compared with a three-layer material such as SUS/Cu/SUS, is suitable also for heat-dissipating material applications. This is conceivably because for example, a two-layer material such as Cu/SUS has high thermal diffusion rate due to the presence of a Cu layer as its surface layer, whose thermal conductivity is higher than that of SUS. Here, in recent years, in mobile electronic devices, there arises a problem of the increase in the quantity of heat generated inside the devices along with the function enhancement of IC chips and the speed-up of communication; for example, in JP Patent No. 5410646 and JP Patent No. 6237950, applying a three-layer material of SUS/Cu/SUS to a chassis inside an electronic device imparts a heat dissipation to the chassis. In the recent years' situation, however, that due to the introduction of the next-generation communication standards, and further downsizing, thickness reduction and the like, the quantity of heat generated is likely to further increase, the two-layer material (particularly SUS/Cu) according to the present invention, which is excellent in heat dissipation as compared with three-layer materials, can solve the problem with the three-layer materials of improving the heat dissipation.

Further, the roll-bonded laminate according to the present invention, since it has excellent flatness and heat dissipation, can suitably be used as heat-dissipating members (for example, heat-dissipative reinforcing members) inside devices.

EXAMPLES

Hereinafter, the present invention will be described in more detail based on Examples and Comparative Example, but the present invention is not limited to these Examples.

Example 1

A roll-bonded laminate composed of Cu and SUS was produced by using, as a first metal plate, a C1020-H (thickness: 0.248 mm) having a surface hardness Hv of 108.2, and as a second metal plate, a SUS304 BA (thickness: 0.098 mm) having a surface hardness Hv of 184, and as follows by a surface-activating bonding method.

A sputter etching treatment was carried out on each surface of bonding surfaces of the C1020-H and the SUS304 BA. The sputter etching on the C1020-H was carried out by making Ar as a sputter gas flow in, under 0.3 Pa, and under the condition of a plasma output of 700 W for 11 min; and the sputter etching on the SUS304 BA was carried out by making Ar as a sputter gas flow in, under 0.3 Pa, and under the condition of a plasma output of 700 W for 11 min.

The C1020-H and the SUS304 BA after the sputter etching treatment were bonded by roll pressure bonding at normal temperature with a rolling roll diameter of 100 mm to 250 mm, and a pressure force of a rolling line load of 0.5 tf/cm to 5.0 tf/cm, to thereby obtain the roll-bonded laminate having the total thickness of 0.339 mm.

Example 2

A roll-bonded laminate having the total thickness of 0.345 mm was produced as in Example 1, except for using, as a second metal plate, a SUS304 ¾H (thickness: 0.098 mm) having a surface hardness Hv of 365.5.

Example 3

A roll-bonded laminate having the total thickness of 0.332 mm was produced as in Example 1, except for using, as a first metal plate, a C1020-O (thickness: 0.248 mm) having a surface hardness Hv of 64.2.

Example 4

A roll-bonded laminate having the total thickness of 0.336 mm was produced as in Example 1, except for using, as a first metal plate, a C1020-O (thickness: 0.248 mm) having a surface hardness Hv of 64.2, and as a second metal plate, a SUS304 ¾H (thickness: 0.098 mm) having a surface hardness Hv of 365.5.

Example 5

A roll-bonded laminate having the total thickness of 0.332 mm was produced as in Example 1, except for making the rolling line load in bonding 1.0 tf/cm to 5.0 tf/cm.

Example 6

A roll-bonded laminate having the total thickness of 0.341 mm was produced as in Example 2, except for making the rolling line load in bonding 1.0 tf/cm to 5.0 tf/cm.

Example 7

A roll-bonded laminate having the total thickness of 0.331 mm was produced as in Example 3, except for making the rolling line load in bonding 1.0 tf/cm to 5.0 tf/cm.

Example 8

A roll-bonded laminate having the total thickness of 0.339 mm was produced as in Example 4, except for making the rolling line load in bonding 1.0 tf/cm to 5.0 tf/cm.

Example 9

A roll-bonded laminate having the total thickness of 0.169 mm was produced as in Example 1, except for using, as a first metal plate, a C1020-H (thickness: 0.122 mm) having a surface hardness Hv of 106.3, and as a second metal plate, a SUS304 BA (thickness: 0.05 mm) having a surface hardness Hv of 195.8.

Example 10

A roll-bonded laminate having the total thickness of 0.168 mm was produced as in Example 1, except for using, as a first metal plate, a C1020-O (thickness: 0.122 mm) having a surface hardness Hv of 58.2, and as a second metal plate, a SUS316L ½H (thickness: 0.05 mm) having a surface hardness Hv of 258.

Example 11

A roll-bonded laminate having the total thickness of 0.29 mm was produced as in Example 1, except for using, as a second metal plate, a SUS304 BA (thickness: 0.05 mm) having a surface hardness Hv of 195.8.

Example 12

A roll-bonded laminate having the total thickness of 0.297 mm was produced as in Example 1, except for using, as a second metal plate, a SUS304 ½H (thickness: 0.05 mm) having a surface hardness Hv of 258.

Example 13

A roll-bonded laminate having the total thickness of 0.287 mm was produced as in Example 1, except for using, as a first metal plate, a C1020-O (thickness: 0.248 mm) having a surface hardness Hv of 64.2, and as a second metal plate, a SUS304 ½H (thickness: 0.05 mm) having a surface hardness Hv of 258.

Example 14

A roll-bonded laminate having the total thickness of 0.192 mm was produced as in Example 1, except for using, as a first metal plate, a C1020-H (thickness: 0.1 mm) having a surface hardness Hv of 105.3, and as a second metal plate, a SUS304 BA (thickness: 0.1 mm) having a surface hardness Hv of 196.

Example 15

A roll-bonded laminate having the total thickness of 0.33 mm composed of Al and SUS was produced as in Example 1, except for using, as a first metal plate, an A1050-H18 (thickness: 0.25 mm) having a surface hardness Hv of 55.7.

Example 16

A roll-bonded laminate having the total thickness of 0.336 mm composed of Cu and Ti was produced as in Example 1, except for using, as a second metal plate, a pure Ti (class 2) (thickness: 0.098 mm) having a surface hardness Hv of 150.4.

Example 17

A roll-bonded laminate having the total thickness of 0.329 mm composed of Al and Ti was produced as in Example 1, except for using, as a first metal plate, an A1050-H18 (thickness: 0.245 mm) having a surface hardness Hv of 55.7, and as a second metal plate, a pure Ti (class 2) (thickness: 0.098 mm) having a surface hardness Hv of 150.4.

Comparative Example 1

A roll-bonded laminate having the total thickness of 0.331 mm was produced as in Example 1, except for using, as a first metal plate, a C1020-O (thickness: 0.248 mm) having a surface hardness Hv of 64.2, and as a second metal plate, a SUS304 ¾H (thickness: 0.098 mm) having a surface hardness Hv of 365.5, and making the rolling line load in bonding 2.0 tf/cm to 5.0 tf/cm.

For the roll-bonded laminates of Examples 1 to 17 and Comparative Example 1, the following characteristics were measured.

[Total Thickness T of the Roll-Bonded Laminate]

The thicknesses at any 30 points of the roll-bonded laminate were measured with a micrometer or the like, and an average value of obtained measurement values was calculated.

[Thicknesses of the First and Second Metal Layers of the Roll-Bonded Laminate]

An optical microscopic photograph of a cross section of the roll-bonded laminate was taken; the thicknesses at any 10 points in the optical microscopic photograph were measured, and an average value of the obtained values was determined.

[Hardness]

The hardnesses of the first and second metal plates and the first and second metal layers of the roll-bonded laminate were measured by using a micro-Vickers hardness tester according to JIS Z2244 (Vicker hardness test-Test method).

[Reduction Ratio]

The reduction ratios of the first metal layer and the second metal layer and the roll-bonded laminate (whole) were determined from the thicknesses of the original plates before being bonded and the final thickness of the roll-bonded laminate.

[Elongation Amount]

Marks were scribed on each of the first metal plate (original plate) and the second metal plate (original plate) at a gauge length of 150 mm and at intervals of 10 mm, and the elongation amount (mm) from the original plate for each of the first metal layer and the second metal layer of the roll-bonded laminate after being bonded was measured.

[Warping Amount and Warping Radius]

A warping test was carried out to measure the warping amount of the roll-bonded laminate. FIG. 1 shows a schematic side view of the warping test. As shown in FIG. 1, a sample cut out into 100 mm in width×100 mm in length from the roll-bonded laminate was placed on a horizontal plane of a platen so that the first metal layer was positioned on the upper side; and the height of a point of the sample whose height from the horizontal plane of the platen became maximum was measured and taken as the warping amount.

Then, the warping radius was calculated from the warping amount. Specifically, by using the warping amount (in FIG. 2, corresponding to an arc height h) and a length (in FIG. 2, corresponding to a circular arc length L) of the sample, the warping radius r corresponding to a radius of the circular arc was calculated by the Newton-Raphson method using expressions: $L=r\theta$, $d=2r\sin(\theta/2)$ and $h=r(1-\cos(\theta/2))$. The shorter the warping radius r, the larger the warping.

Figure 3:
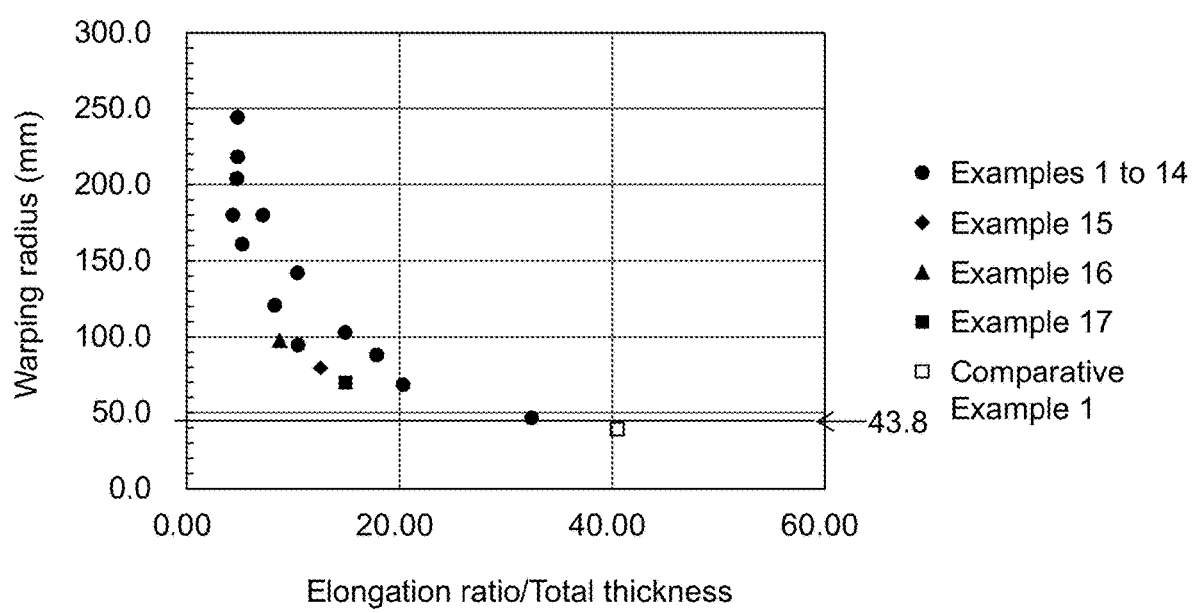
FIG. 3 is a graph indicating relations between the elongation ratio/the total thickness and the warping radius in roll-bonded laminates of Examples 1 to 17 and Comparative Example 1.

Table 1 shows constitutions of the roll-bonded laminates of Examples 1 to 17 and Comparative Example 1, characteristics of each layer and evaluation results; Table 2 shows hardnesses, thicknesses and reduction ratios of the first and second metal layers of the roll-bonded laminates produced in Examples 1 to 17 and Comparative Example 1; and FIG. 3 shows relations between the elongation ratio/the total thickness $((\Delta L_1/\Delta L_2)/T)$ and the warping radius in the roll-bonded laminates of Examples 1 to 17 and Comparative Example 1.

TABLE 1

|  | Constitution | First metal plate (original plate) | | | Second metal plate (original plate) | | | Difference in hardness (Hv) |
|---|---|---|---|---|---|---|---|---|
|  |  | Metal kind | Thickness (mm) | Hardness (Hv) | Metal kind | Thickness (mm) | Hardness (Hv) |  |
| Example 1 | Cu/SUS | C1020-H | 0.248 | 108.2 | SUS304 BA | 0.098 | 184 | 75.8 |
| Example 2 | Cu/SUS | C1020-H | 0.248 | 108.2 | SUS304 3/4H | 0.098 | 365.5 | 257.3 |
| Example 3 | Cu/SUS | C1020-O | 0.248 | 64.2 | SUS304 BA | 0.098 | 184 | 119.8 |
| Example 4 | Cu/SUS | C1020-O | 0.248 | 64.2 | SUS304 3/4H | 0.098 | 365.5 | 301.3 |
| Example 5 | Cu/SUS | C1020-H | 0.248 | 108.2 | SUS304 BA | 0.098 | 184 | 75.8 |
| Example 6 | Cu/SUS | C1020-H | 0.248 | 108.2 | SUS304 3/4H | 0.098 | 365.5 | 257.3 |
| Example 7 | Cu/SUS | C1020-O | 0.248 | 64.2 | SUS304 BA | 0.098 | 184 | 119.8 |
| Example 8 | Cu/SUS | C1020-O | 0.248 | 64.2 | SUS304 3/4H | 0.098 | 365.5 | 301.3 |
| Example 9 | Cu/SUS | C1020-H | 0.122 | 106.3 | SUS304 BA | 0.05 | 195.6 | 89.5 |
| Example 10 | Cu/SUS | C1020-O | 0.122 | 58.2 | SUS316L 1/2H | 0.05 | 258 | 199.8 |
| Example 11 | Cu/SUS | C1020-H | 0.248 | 108.2 | SUS304 BA | 0.05 | 195.8 | 87.6 |
| Example 12 | Cu/SUS | C1020-H | 0.248 | 108.2 | SUS304 1/2H | 0.05 | 258 | 149.8 |
| Example 13 | Cu/SUS | C1020-O | 0.248 | 64.2 | SUS304 1/2H | 0.05 | 258 | 193.8 |
| Example 14 | Cu/SUS | C1020-H | 0.1 | 105.3 | SUS304 BA | 0.1 | 196 | 90.7 |
| Example 15 | Al/SUS | A1050-H18 | 0.25 | 55.7 | SUS304 BA | 0.098 | 184 | 128.3 |
| Example 16 | Cu/Ti | C1020-H | 0.248 | 108.2 | Ti | 0.098 | 150.4 | 42.2 |
| Example 17 | Al/Ti | A1050-H18 | 0.245 | 55.7 | Ti | 0.098 | 150.4 | 94.7 |
| Comparative Example 1 | Cu/SUS | C1020-O | 0.248 | 64.2 | SUS304 3/4H | 0.098 | 365.5 | 301.3 |

TABLE 1-continued

|  | Second metal Layer ratio | Total thickness T (mm) | Elongation amount (based on 150 mm) | | Elongation ratio ($\Delta L_1/\Delta L_2$) | Warping amount (mm) | Warping radius (mm) | Elongation ratio/ Total thickness ($\Delta L_1/\Delta L_2$)/T |
|---|---|---|---|---|---|---|---|---|
|  |  |  | First metal layer $\Delta L_1$ (mm) | Second metal layer $\Delta L_2$ (mm) |  |  |  |  |
| Example 1 | 0.289 | 0.339 | 2.6 | 1.6 | 1.63 | 5.1 | 244.2 | 4.79 |
| Example 2 | 0.284 | 0.345 | 0.6 | 0.4 | 1.50 | 6.9 | 180.0 | 4.35 |
| Example 3 | 0.295 | 0.332 | 5.1 | 3.2 | 1.59 | 5.7 | 218.3 | 4.80 |
| Example 4 | 0.292 | 0.336 | 3.0 | 0.5 | 6.00 | 13.8 | 88.2 | 17.86 |
| Example 5 | 0.295 | 0.332 | 7.4 | 4.7 | 1.57 | 6.1 | 203.9 | 4.74 |
| Example 6 | 0.287 | 0.341 | 2.5 | 0.7 | 3.57 | 12.9 | 94.7 | 10.47 |
| Example 7 | 0.296 | 0.331 | 7.1 | 4.1 | 1.73 | 7.7 | 161.0 | 5.23 |
| Example 8 | 0.289 | 0.339 | 4.4 | 0.4 | 11.00 | 24.4 | 46.5 | 32.45 |
| Example 9 | 0.296 | 0.169 | 1.4 | 1.0 | 1.40 | 10.2 | 120.8 | 8.28 |
| Example 10 | 0.298 | 0.168 | 1.5 | 0.6 | 2.50 | 11.9 | 103.0 | 14.88 |
| Example 11 | 0.172 | 0.29 | 2.7 | 1.3 | 2.06 | 6.9 | 180.0 | 7.16 |
| Example 12 | 0.168 | 0.297 | 0.7 | 0.5 | 1.40 | 6.1 | 203.9 | 4.71 |
| Example 13 | 0.174 | 0.287 | 3.5 | 0.6 | 5.83 | 17.5 | 68.3 | 20.33 |
| Example 14 | 0.521 | 0.192 | 0.6 | 0.3 | 2.00 | 8.7 | 142.2 | 10.42 |
| Example 15 | 0.297 | 0.33 | 5.4 | 1.3 | 4.15 | 15.2 | 79.6 | 12.59 |
| Example 16 | 0.292 | 0.336 | 4.7 | 1.6 | 2.94 | 12.5 | 97.8 | 8.74 |
| Example 17 | 0.298 | 0.329 | 5.4 | 1.1 | 4.91 | 17.2 | 69.6 | 14.92 |
| Comparative Example 1 | 0.296 | 0.331 | 6.7 | 0.5 | 13.40 | 27.8 | 39.2 | 40.48 |

TABLE 2

|  | Hardness (Hv) | | Thickness (mm) | | Redaction ratio (%) | | |
|---|---|---|---|---|---|---|---|
|  | First metal layer | Second metal layer | First metal layer | Second metal layer | First metal layer | Second metal layer | Whole |
| Example 1 | 112.5 | 203.6 | 0.243 | 0.096 | 2.0 | 2.0 | 2.0 |
| Example 2 | 118.8 | 370.6 | 0.247 | 0.098 | 0.4 | 0.0 | 0.3 |
| Example 3 | 87.9 | 221.4 | 0.236 | 0.096 | 4.8 | 2.0 | 4.0 |
| Example 4 | 80.3 | 366 | 0.239 | 0.097 | 3.6 | 1.0 | 2.9 |
| Example 5 | 110.4 | 230.8 | 0.237 | 0.095 | 4.4 | 3.1 | 4.0 |
| Example 6 | 110 | 366.6 | 0.243 | 0.098 | 2.0 | 0.0 | 1.4 |
| Example 7 | 79.9 | 216.2 | 0.236 | 0.095 | 4.8 | 3.1 | 4.3 |
| Example 8 | 89.5 | 371.8 | 0.242 | 0.097 | 2.4 | 1.0 | 2.0 |
| Example 9 | 109.2 | 235.8 | 0.12 | 0.049 | 1.6 | 2.0 | 1.7 |
| Example 10 | 75.2 | 258.8 | 0.119 | 0.049 | 2.5 | 2.0 | 2.3 |
| Example 11 | 108.8 | 211.8 | 0.241 | 0.049 | 2.8 | 2.0 | 2.7 |
| Example 12 | 121 | 258.2 | 0.247 | 0.05 | 0.4 | 0.0 | 0.3 |
| Example 13 | 86.1 | 258.6 | 0.238 | 0.049 | 4.0 | 2.0 | 3.7 |
| Example 14 | 108.9 | 208.1 | 0.094 | 0.098 | 6.0 | 2.0 | 4.0 |
| Example 15 | 58.6 | 206.4 | 0.235 | 0.095 | 6.0 | 3.1 | 5.2 |
| Example 16 | 108.5 | 152.6 | 0.24 | 0.096 | 3.2 | 2.0 | 2.9 |
| Example 17 | 58.1 | 151 | 0.232 | 0.097 | 5.3 | 1.0 | 4.1 |
| Comparative Example 1 | 105.2 | 375.4 | 0.233 | 0.098 | 6.0 | 0.0 | 4.3 |

As is apparent from Table 1 and FIG. 3, the roll-bonded laminates of Examples 1 to 17, in which the elongation ratio/total thickness was 38 or lower (that is, $0<(\Delta L_1/\Delta L_2)/T \leq 38$), in any constitutions of Cu/SUS, Al/SUS, Cu/Ti and Al/Ti, had a warping radius of not less than 43.8 mm, which was the minimum value which brought about an actual result of warp reformation, revealing that warping was sufficiently controlled. By contrast, the roll-bonded laminate of Comparative Example 1, in which the elongation ratio/total thickness was higher than 38, had a warping radius of less than 43.8 mm, and caused a large warping which could not be reformed even if shape correction was carried out.

Reference Example

Evaluation of the Heat Dissipation

The heat dissipation of two-layer materials of Cu/SUS, and a three-layer material of SUS/Cu/SUS was evaluated.

As a two-layer material of Cu/SUS, the two-layer material (Example 14) composed of a C1020-H (thickness: 0.1 mm) and a SUS304 BA (thickness: 0.1 mm) was used. By using a C1020-H (thickness: 0.125 mm) and a SUS304 H (thickness: 0.072 mm) (for a two-layer material 1), and using a C1020-H (thickness: 0.1 mm) and a SUS304 H (thickness: 0.072 mm) (for a two-layer material 2), the two-layer materials which had different ratios in thickness of SUS and copper were further produced as in Example 1. The thickness of the two-layer material of Example 14 was 0.192 mm; the thickness of the two-layer material 1 was 0.195 mm; and the thickness of the two-layer material 2 was 0.171 mm, and the reduction ratio of SUS of either of the two-layer material 1 and the two-layer material 2 was lower than 1%.

A three-layer material of SUS/Cu/SUS was produced by using a C1020-H (thickness: 0.10 mm) and a SUS304 (¾H) (thickness: 0.05 mm) to produce a two-layer material as in Example 1, and bonding the two-layer material and the SUS as in production of the two-layer material. The total thickness of the three-layer material was 0.200 mm. The reduction ratio of either SUS in the three-layer material was lower than 1%.

Figure 4:
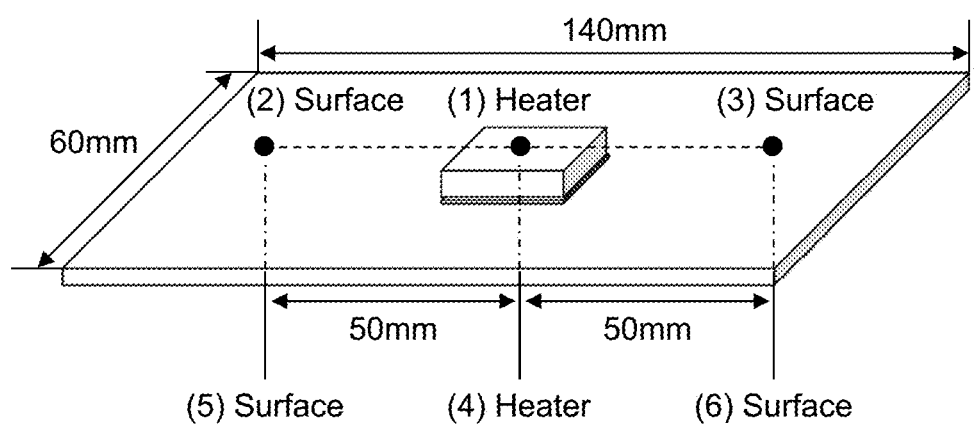
FIG. 4 is a view showing a method of evaluating the heat dissipation in Reference Example.
Figure 5:
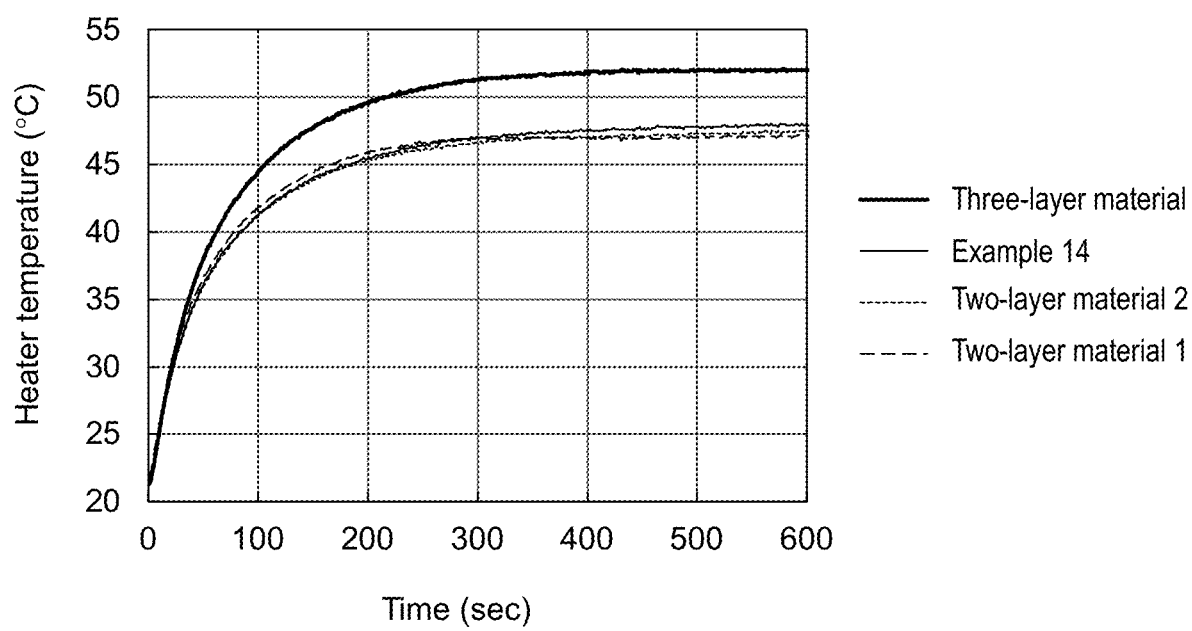
FIG. 5 is graphs showing evaluation results of the heat dissipation of two-layer materials of Cu/SUS and a three-layer material of SUS/Cu/SUS in Reference Example.

The heat dissipation of the two-layer materials of Cu/SUS and the three-layer material of SUS/Cu/SUS was evaluated by placing a sample plate cut out into a size of 60 mm×140 mm under a heater, as shown in FIG. 4, wherein for the two-layer materials, the Cu surface was placed on the heater side, and raising the temperature of the heater and measuring the change with time in the temperature of the heater (heat generating part). In FIG. 5, evaluation results of the heat dissipation of the two-layer materials of Cu/SUS and the three-layer material of SUS/Cu/SUS are shown.

As shown in FIG. 5, the temperature of the heater after 600 sec was 48.0° C. for the two-layer material of Cu/SUS of Example 14; 47.1° C. for the two-layer material 1; 47.5° C. for the two-layer material 2; and 52.0° C. for the three-layer material. Here, when the heater was heated without the two-layer material nor the three-layer material, the temperature of the heater after 600 sec rose to 95° C. or so. Hence, it was shown that the two-layer materials of Cu/SUS, as compared with the three-layer material of SUS/Cu/SUS, had lower temperature rise with time of the heater and higher heat dissipation. The reason why the higher heat dissipation was provided is conceivably because the thermal conductivity of Cu (391 W/m·K) was very high as compared with the thermal conductivity of SUS (16.3 W/m·K), and in the two-layer materials of Cu/SUS, Cu, high in the thermal conductivity, could be brought into contact with the heater.

All publications, patents and patent applications quoted in the present description are as they are incorporated by reference in the present description.

The invention claimed is:

1. A method for producing a roll-bonded laminate having a two-layer structure of a first metal layer and a second metal layer, by roll-bonding a first metal plate and a second metal plate,
wherein a surface hardness Hv of the first metal plate is lower than a surface hardness Hv of the second metal plate; and
the method comprises:
sputter etching each of bonding surfaces of the first metal plate and the second metal plate to partially remove an oxide film on each of the bonding surfaces;
roll-bonding so as to satisfy the following expression (1):

$$0<(\Delta L_1/\Delta L_2)/T \leq 38 \quad (1)$$

wherein $\Delta L_1$ (mm) represents an elongation amount of the first metal layer with respect to the first metal plate; $\Delta L_2$ (mm) represents an elongation amount of the second metal layer with respect to the second metal plate; T (mm) represents the total thickness of the roll-bonded laminate; and an elongation ratio ($\Delta L_1/\Delta L_2$) is 1.1 to lower than 4.15; and
subjecting the roll-bonded laminate to a shape correction using a tension leveler to make an elongation ratio of about 1 to 2%.

2. The method for producing a roll-bonded laminate according to claim 1, wherein the total thickness of the roll-bonded laminate is 0.1 mm to 0.5 mm.

3. The method for producing a roll-bonded laminate according to claim 1, wherein the first metal layer comprises copper, aluminum or an alloy thereof; and the second metal layer comprises a stainless steel, titanium, a titanium alloy or a nickel alloy.

4. The method for producing a roll-bonded laminate according to claim 1, wherein the first metal layer comprises copper; and the second metal layer comprises a stainless steel.

5. The method for producing a roll-bonded laminate according to claim 1, wherein a difference in hardness between the surface hardness Hv of the second metal plate and the surface hardness Hv of the first metal plate is 35 to 305.

6. The method according to claim 1, wherein an etching amount of the second metal plate is 1 nm to 10 nm during the sputter etching.

7. The method according to claim 1, wherein an etching amount of the first metal plate is 2 nm to 30 nm in the sputter etching.

8. The method according to claim 1, wherein the elongation ratio ($\Delta L_1/\Delta L_2$) is 1.1 to 3.57.

* * * * *